United States Patent [19]

Tiggelbeck et al.

[11] Patent Number: 5,230,872
[45] Date of Patent: Jul. 27, 1993

[54] METHOD AND APPARATUS FOR REGENERATING ACTIVATED CARBON CONTAINING AN ADSORBED VOLATILE ORGANIC ABSORBATE

[75] Inventors: Donald D. Tiggelbeck, Pittsburgh; George M. Goyak, Murrsyville, both of Pa.

[73] Assignee: Tigg Corporation, Pittsburgh, Pa.

[21] Appl. No.: 749,946

[22] Filed: Aug. 26, 1991

[51] Int. Cl.⁵ .................. B01D 11/02; B01D 53/00; B01J 8/00; B01J 20/34

[52] U.S. Cl. .................... 422/261; 422/144; 422/145; 422/216; 422/232; 422/234; 422/235; 55/59; 55/60; 122/4 D; 502/55

[58] Field of Search .............. 55/59, 60, 61; 502/20, 502/34, 45, 47, 55; 122/4 D; 422/261, 216, 234, 235, 232, 233, 144, 145

[56] References Cited

U.S. PATENT DOCUMENTS

| | | | |
|---|---|---|---|
| 1,522,480 | 1/1925 | Allen | 55/61 |
| 1,836,301 | 12/1931 | Bechthold | 55/61 |
| 2,844,516 | 7/1958 | Berg | 422/223 |
| 4,971,606 | 11/1990 | Sircar et al. | 55/59 |
| 4,980,325 | 12/1990 | Sechrist | 502/37 |

FOREIGN PATENT DOCUMENTS

| | | | |
|---|---|---|---|
| 2631225 | 1/1978 | Fed. Rep. of Germany | 501/55 |
| 0001294 | 1/1979 | Japan | 502/55 |
| 2286541 | 12/1979 | Japan | 502/55 |
| 0461118 | 2/1975 | U.S.S.R. | 502/55 |

Primary Examiner—Robert J. Warden
Assistant Examiner—Christopher Y. Kim
Attorney, Agent, or Firm—Harry B. Keck

[57] ABSTRACT

Activated carbon regeneration is carried out in a downwardly moving bed with superheated steam moving upwardly through the bed. The superheated steam is maintained in a closed loop which comprises the steam treatment vessel, a steam pump and a steam superheater. The superheated steam is supplied at low pressure (e.g. less than about 10 psig) and provides the heat for volatilizing water and desorbed organic volatiles. The resulting dry, partially regenerated activated carbon may be re-used directly, but preferably is treated in a vacuum chamber to remove residual water and additional adsorbate.

9 Claims, 2 Drawing Sheets

METHOD AND APPARATUS FOR REGENERATING ACTIVATED CARBON CONTAINING AN ADSORBED VOLATILE ORGANIC ABSORBATE

BACKGROUND OF THE INVENTION

1. Field of the Invention

This invention relates to a method and apparatus for regenerating wet activated carbon containing adsorbed volatile organic adsorbate and more particularly to a method and apparatus involving sequential treatment with low pressure steam and vacuum to achieve effective regeneration.

2. Description of the Prior Art

Activated carbon is employed as an adsorbent for removing selected ingredients from a fluid (gas or liquid) in which the ingredients are carried as a minor component. The effectiveness of activated carbon in removing selected ingredients decreases as the adsorbed quantity of the ingredient increases. The phrase "spent activated carbon" herein refers to activated carbon with a lowered effectiveness resulting from its adsorbed adsorbate. The "spent activated carbon" may be restored to greater effectiveness through regeneration. The activated carbon containing adsorbate may be regenerated to desorb the adsorbed ingredient whereby the adsorption effectiveness of the regenerated activated carbon approaches that of fresh activated carbon. Regeneration typically occurs by heating in air or in steam or inert gases and by vacuum treatment. Heating in air or any sort of oxidizing atmosphere causes some combustion of the activated carbon and a corresponding increase in the size of the pores of the activated carbon where adsorption occurs. As a result the heat-regenerated activated carbon has a lowered attainable effectiveness. Steam regeneration is effective in removing only a portion of the adsorbed volatile organic adsorbate and leaves behind within the pores of the activated carbon a substantial amount of the adsorbed volatile organic adsorbate which precludes restoration of the initial adsorption effectiveness of the activated carbon. Vacuum treatment of wet activated carbon containing adsorbed organic volatile adsorbate is ineffective because of the need to volatilize the water of the wet activated carbon as well as the adsorbed volatile organic adsorbate.

STATEMENT OF THE PRESENT INVENTION

According to the present invention, wet activated carbon containing adsorbed volatile organic ingredients can be effectively regenerated with low pressure, superheated steam which serves to drive off moisture and to desorb some of the adsorbed volatile organic adsorbate. The low pressure superheated steam treatment is preferably carried out in a steam treatment vessel through which the activated carbon moves as a downwardly moving bed. Superheated steam, preferably 300° to 500° F., at low pressure, less than 30 psig, is introduced into the bottom of the steam treatment vessel. The sensible heat of the superheated low pressure steam vaporizes the moisture of the wet activated carbon and heats the activated carbon to promote devolatilization of adsorbed volatile organic adsorbate. A temperature differential exists from the bottom of the moving bed (relatively high temperature) to the top of the downwardly moving bed (relatively low temperature). The superheated steam and desorbed volatilized organic adsorbate are withdrawn from the steam treatment vessel as an exit gas. The moisture which has been volatilized appears in the exit has as additional low pressure steam. A portion of the exit gas is reheated and returned to the bottom of the steam treatment vessel where the superheated steam and some recirculating volatile organic adsorbate provide sensible heat for the carbon regeneration which occurs in the steam treatment vessel. A portion of the exit has from the steam treatment vessel is chilled to condense the volatile adsorbate and steam for collection.

Wet activated carbon containing adsorbed volatile organic adsorbate is introduced continuously or intermittently into the top of the steam treatment vessel at the top of a downwardly moving bed of activated carbon within the vessel. Corresponding dry activated carbon which has been partially regenerated and which contains residual adsorbed volatile organic adsorbate is withdrawn from the bottom of the steam treatment vessel for reuse or for further regeneration treatment, preferably a vacuum regeneration treatment. The dry, partially regenerated activated carbon is introduced into a vacuum treatment chamber. This carbon remains at an elevated temperature. The residual gases are withdrawn from the vacuum treatment chamber and the resulting subatmospheric pressure within the vacuum chamber promotes continuing desorption of the residual organic volatile adsorbate from the carbon. The latent heat of vaporization of the volatilizing adsorbate cools the activated carbon within the vacuum chamber to a desirable level for immediate re-use. When the desired level of desorption is achieved, the vacuum pump is disconnected, the vacuum chamber is opened and the regenerated activated carbon is recovered for re-use. The adsorbate recovered from the vacuum chamber preferably is chilled, condensed and recovered.

The two sequential treatments achieve a level of effectiveness approaching that of virgin activated carbon. Note that the regeneration process does not expose the activated carbon to air or oxygen at elevated temperatures and thus avoids oxidative deterioration of the activated carbon.

Energy requirements of the process are surprisingly low. Because the required superheated steam is maintained in a closed loop, and does not condense, the latent heat of vaporization of the steam is conserved throughout the process. Small portions of the recirculating steam may condense in the system without adversely affecting the regeneration.

DESCRIPTION OF THE PREFERRED EMBODIMENT(S)

When activated carbon containing adsorbed volatile organic adsorbate employs steam or hot inert gas regeneration to remove the adsorbate, total desorption is not feasible because some of the volatile organic adsorbate will remain within the micropores of the activated carbon, resisting all reasonable attempts at desorption. However it may be feasible to desorb sufficient adsorbate to permit re-use of the activated carbon by restoring much of its capacity for adsorption. More vigorous furnace reactivation of activated carbon can frequently remove substantially all adsorbate, but with attendant oxidation of the carbon particle skeleton which changes the pore structure and subsequent adsorption efficiency (usually detrimental changes).

Figures 1, 3:
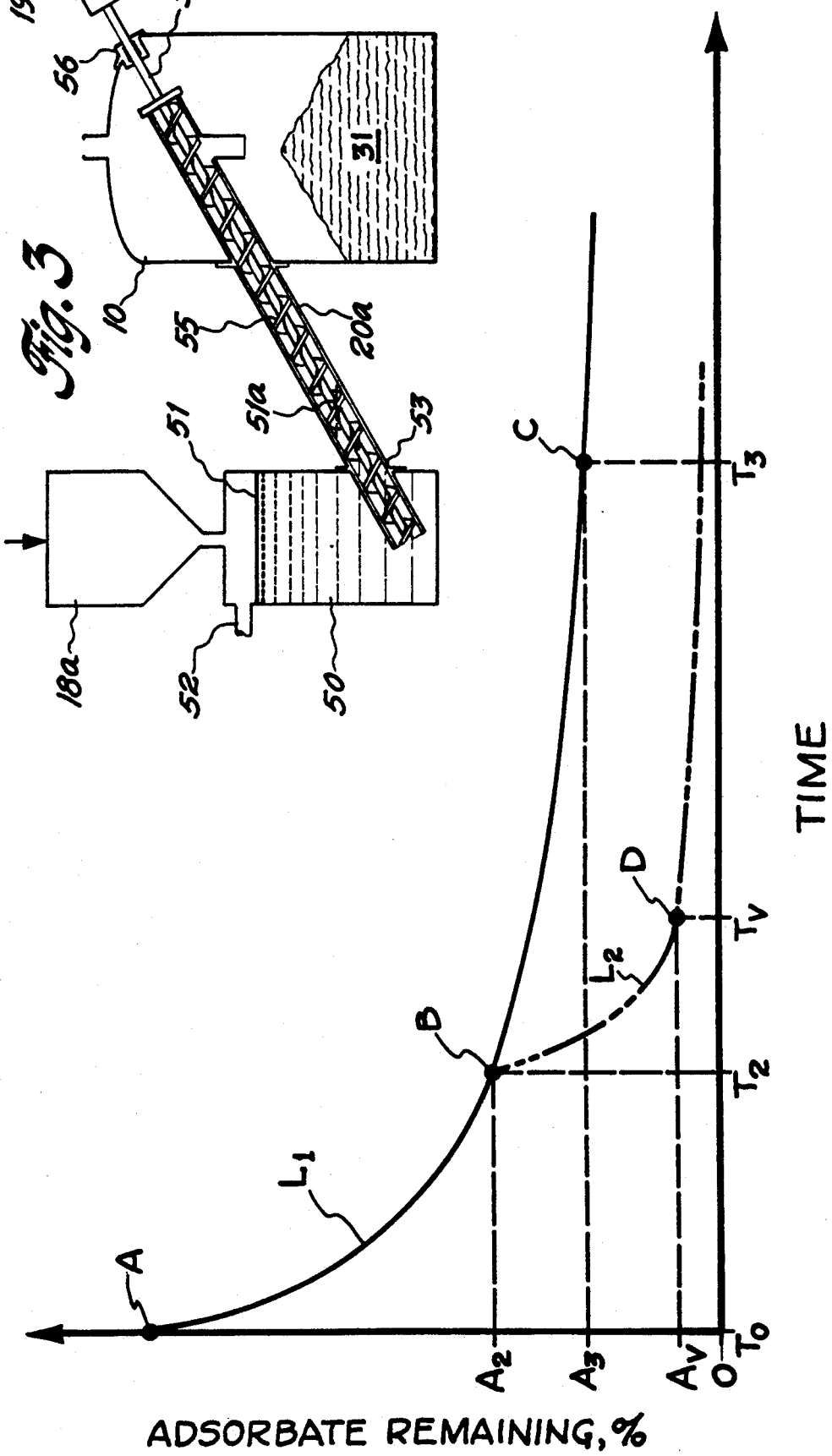
FIG. 1 is a graphical illustration of activated carbon regeneration showing the decrease in remaining adsorbate with time for a steam regeneration.
FIG. 3 is a schematic illustration of alternative feeding apparatus.

Referring to FIG. 1 there is illustrated a graphical representation of a typical steam regeneration of activated carbon. The ordinate represents the amount of adsorbate remaining on the activated carbon, expressed as percentage by weight of the activated carbon. The abscissa is a time line. The line $L_1$ is a desorption curve for the particular adsorbent at the existing temperature and pressure. When the steam regeneration commences at time$=0$ ($T_0$), the activated carbon has $A_0$ percent by weight adsorbent as illustrated by the point A. Initial desorption occurs rapidly at a decreasing rate until a point of diminishing returns B is achieved at time $T_2$ and concentration $A_2$. Continued exposure to the steam regeneration conditions does not significantly lower the adsorbate content of the activated carbon. For many applications, such regeneration is adequate, i.e., a regenerated activated carbon having a residual adsorbate content of $A_2$. However many modern decontamination installations demand decontamination to levels which cannot be achieved with regenerated activated carbon having a residual adsorbate content of $A_2$ or greater. Further reduction in the adsorbate content below the level $A_2$ may be achieved by continued exposure to the steam as illustrated at the point C. The Points A,B,C lie on the desorption Curve $L_1$ which establishes the remaining adsorbate content at the system temperature and pressure. In general, there is a limit to the available removal of adsorbate via steam treatment as indicated by the leveling of the desorption curve $L_1$. Moreover the abrupt change of slope of the desorption curve $L_1$ at the Point B suggests that further steam desorption treatment may not be cost effective, i.e., significant exposure time results in decreased rates of desorption.

According to this invention, the carbon is subjected to a vacuum desorption commencing at the Point B. The broken line $L_2$ is a desorption curve for activated carbon at times following application of vacuum to the carbon. The absolute pressure decreases abruptly and the residual adsorbent content correspondingly decreases abruptly along the line $L_2$. At the Time $T_v$, corresponding to the desired treatment pressure, the residual adsorbent is reduced to $A_v$, as indicated by the Point D. It will be noted that the residual content $A_v$ is less than the content $A_3$ which is the realistic limit of desorption achievable via steam treatment alone. The combined steam and vacuum treatment thus yields a level of desorption which will provide regenerated carbon suitable to achieve the low level decontamination required in many installations.

Figure 2:
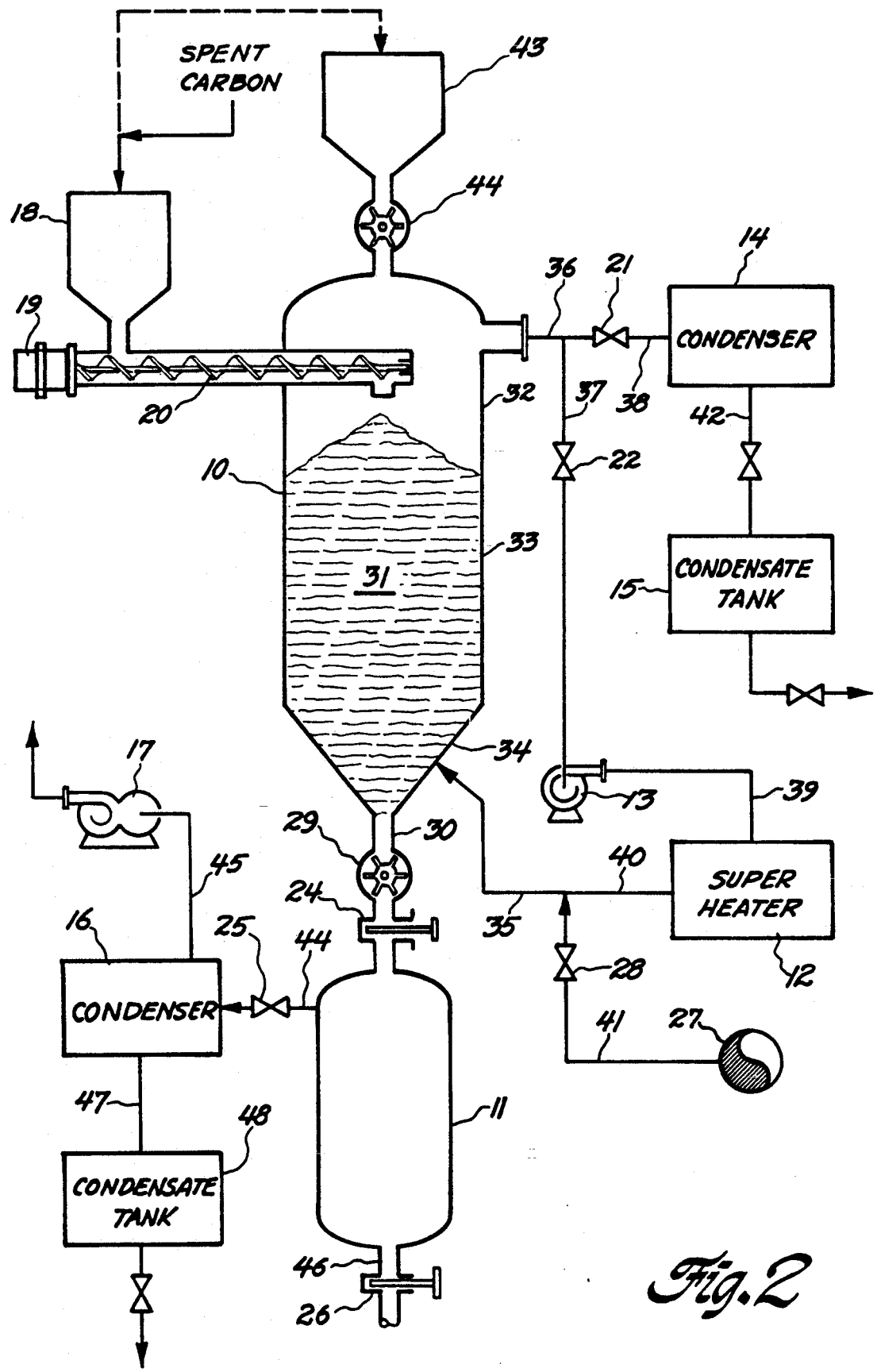
FIG. 2 is a schematic illustration of apparatus of this invention in which the method of the invention may be carried out.

Referring to FIG. 2, there is illustrated a steam treatment vessel 10, a vacuum chamber 11, a superheater 12, a compressor 13, a condenser 14, a condensate tank 15, a condenser 16, a vacuum pump 17, a solids feeding device 18 including a motor 19 with a helical drive 20. Appropriate valves 21, 22, 24, 25, 26, 28 are provided in conduits to be described. The steam treatment vessel 10 contains a downwardly moving bed 31 of activated carbon particles. The vessel 10 has a top portion 32, an intermediate portion 33 and a bottom portion 34. Low pressure, superheated steam is introduced into the steam treatment vessel 10 through a conduit 35. The steam, at a temperature of 300°–500° F. (preferably 350°–400° F.) and at a low pressure, less than 20 psig (preferably less than 10 psig) rises through the bed 31 and surrenders its sensible heat to evaporate moisture from the activated carbon and to promote desorption and volatilization of adsorbed organic volatile adsorbate from the activated carbon.

Fresh wet activated carbon containing adsorbed organic volatile adsorbate is introduced from the feeding device 18 through the helical drive 20 which is driven by motor 19. Preferably wet activated carbon is introduced intermittently or continuously to the top of the bed 31 while a corresponding intermittent or continuous quantity of dried, partially regenerated activated carbon particles containing residual adsorbed volatile organic adsorbate are withdrawn from the bottom portion 34 through a star valve 29 or other pressure confining valve means.

The exit gases from the steam treatment vessel 10 contain predominantly saturated steam and volatilized organics which have been desorbed from the activated carbon. The exit gases are recovered through a conduit 36. A portion of the exit gases from the conduit 36 is delivered through a conduit 37 containing valve 22 to the compressor 13 for pressurizing prior to superheating. The pressurized exit gases are delivered to the superheater 12 in which the exit gases are reheated from their exit gas temperature preferably 212°–250° F. to a recirculating temperature, 300°–500° F. The superheated steam and gases are delivered through a conduit 39 to the superheater 12 which delivers low pressure superheated steam through a conduit 40 to the inlet conduit 35. It will be observed that the low pressure superheated steam is continually circulated within a loop which includes the steam treatment vessel 10, conduit 36, conduit 37, compressor 13, conduit 39, superheater 12, conduit 40 and conduit 35.

The remainder of the exit gases from the conduit 36 is delivered through a conduit 38 to a condenser 14 in which the exit gas is chilled and condensed to form water and adsorbate which is collected through a conduit 42 in the condensate tank 15.

Alternatively the wet activated carbon may be introduced into a hopper 43 which communicates with the steam vessel 10 through a star valve 44 or other pressure resisting metering device.

The heating burden of the superheater 12 is merely to supply superheat to the recirculating steam and adsorbate in conduit 39. Preferably a supplemental source of superheated steam 27 which can be high pressure steam, is provided to initiate operation of the system, to establish the initial temperatures within the steam treatment vessel 10 and the remainder of the steam loop.

For startup, the compressor 13 and the superheater 12 are activated. A cold system can be brought to operating temperatures without difficulty. An alternative source of superheated steam 27 can develop quicker startup through conduit 41, valve 28 and conduit 31.

The dry, partially regenerated activated carbon which is recovered from the steam treatment vessel 10 may be useful for re-use in many activated carbon cleanup installations which do not demand extremely low level decontamination. However the dry, partially regenerated activated carbon from the steam treatment vessel 10 can be further regenerated in accordance with a preferred embodiment of this invention in which the dry partially regenerated activated carbon is delivered into a vacuum chamber 11. By means of valves 24, 26, the chamber 11 can be closed and the gaseous contents thereof can be withdrawn through a conduit 44, valve 25 condenser 16, and conduit 45 by means of vacuum pump 17. The dry, partially regenerated activated carbon entering the vacuum chamber 11 is at an elevated temperature and contains substantial sensible heat. The vacuum pump withdraws any residual steam and the volatillized absorbate from the chamber 11. Thereafter, as the vacuum pump 17 continues to evacuate the chamber 11, the chamber pressure is reduced to sufficiently subatmospheric pressures to cause devolatilization of the desired quantity of residual adsorbate. Pressures of $10^{-2}$ to $10^{-3}$ torr (about 1 to 10 microns) are preferred. The vacuum treatment requires a small fraction of the time which is required for the activated carbon to pass through the steam treatment vessel 10. Accordingly the vacuum chamber 11 can have a volume which is a corresponding small fraction of the volume of the steam treatment vessel 10.

As the residual adsorbate is volatilized in the vacuum chamber 11, the temperature of the activated carbon is reduced through heat loss to provide the necessary latent heat for adsorbate desorption and volatilization. Accordingly the regenerated activated carbon, withdrawn from the chamber 11 through a conduit 46, is cooled to an appropriate temperature for immediate re-use or storage.

Condensed adsorbate is recovered from the condenser 16 through a conduit 47 into a condensate tank 48.

EXAMPLE

Consider a typical regeneration installation for treating activated carbon at 60° F. as follows:
Feed:
1,000 lbs/hr carbon (dry basis)
1,000 lbs/hr water
200 lbs/hr organics.
The activated carbon is introduced through the solids feeding device 18 into the steam treatment vessel 10, a stainless steel tank (3/16-inch sheet); 7 feet diameter; 11 feet high. The bed 31 of activated carbon contains 8,000 lbs carbon (dry basis).
The resulting product contains at 350° F.:
Product:
1,000 lbs/hr carbon (dry basis)
50 lbs/hr water
40 lbs/hr organics.
The steam stripping efficiency for the organics is 80%, i.e., 160 lbs/hr of the organics are removed in the condenser 14.

The described steam treatment product is introduced into the vacuum chamber 11 and maintained until the chamber pressure is reduced about to $10^{-3}$ torr. The product from the vacuum chamber 11 through the conduit 46 contains at 140° F.:
Product:
1,000 lbs/hr carbon (dry basis)
>1 lb/hr water
>1 lb/hr organics.

SUPERHEATED STEAM

For the purposes of this example, the superheated steam entering the conduit 35 is at 400° F. and thus contains approximately 90 btu/lb available superheat. At 80% thermal efficiency, the required heat for the steam treatment in vessel 10 is 1,625,000 btu/hr corresponding to approximately 10,400 cubic feet per minute of superheated steam at 400° F. The gas flow is less than one-half of the fluidization velocity, i.e., the downwardly moving bed is not agitated.

REQUIRED COOLING WATER

The condenser 14 will condense 950 lbs/hr of steam and 160 lbs/hr organics. The condensation can be achieved and the condensate can be cooled to 60° F. with 145 gallons per minute of cooling water at 20° F. temperature differential (water temperature in minus water temperature out).

THE SUPERHEATER

The superheater will be required to reheat 18,060 lbs/hr of recirculating superheated steam by adding approximately 90 btu/lb to the steam. The heat requirement for the superheater is 1,625,000 btu/hr.

COOLING WATER REQUIREMENTS FOR VACUUM TREATMENT CONDENSER

The vacuum treatment chamber generates 50 lbs/hr water vapor and 40 lbs/hr organic vapor. The required cooling water, having a temperature differential of 20° F., is 10 gallons per minute.

START-UP STEAM REQUIREMENTS

In order to start up the unit, the steam treatment vessel 10 is filled with activated carbon requiring regeneration. Thus the start-up inventory of the bed 31 at 60° F. is:
8,000 lbs carbon
8,000 lbs water
1,600 lbs organics.
Supplemental steam from source 27 is available at 100 psig (337° F.). The steam is reduced to about 2 psig prior to entering the conduit 41. The steam requirement is 2,216 lbs in order to elevate the temperature of the bed 31 to 212° F.

At that stage the system can be brought to equilibrium conditions by means of the superheater 12 and compressor 13 or supplemental steam from source 27, or both.

SUMMARY

Based upon the foregoing example, the present process requires 1,625 btu/lb to regenerte 1 lb of spent activated carbon (dry basis). The cooling water requirements are 0.155 gallons for each lb of spent carbon.

COMPARISON

A typical thermal regeneration state-of-the-art installation for spent activated carbon requires about 9,000 btu/lb. That is, 3,500 btu/lb is required for a regeneration furnace and 5,500 btu/lb is required for an after burner which operates at elevated temperatures to guarantee combustion of the desorbed volatilized organics. Thus the present process requires $$\frac{1625}{9000} \times 100 = 18\% \text{ of the btu needed by the state-of-the-art thermal regeneration system.}$$

The benefit of using superheated steam in a closed loop in the present regeneration process and apparatus is that the only required heat is for reheating the superheated steam to the selected temperature, e.g., 400° F.

For comparison, if once-through steam (psig, reduced to 2 psig) were employed in the same Example, the steam requirement would be 27,000 lbs/hr of steam—which must then be cooled by a condenser with greatly increased cooling water requirements. The cooling water requirements of the present described invention are about 1/25 of the cooling water requirements (and condenser capacity) of state-of-the-art steam regeneration procedures.

An alternative feeding system for wet, spent activated carbon is illustrated in FIG. 3. The alternative feeding system employs an inclined dewatering screw 20a. The solids feed hopper 18a deposits wet, spent activated carbon in a closed container 50 containing water to a level 51. Overflow water is withdrawn through a conduit 52. The inlet end 53 of the dewatering screw 20a is positioned within the closed container 50 beneath the water level 51. A motor 19a, preferably outside the vessel 10, rotates a shaft 54 and flights 55 of the dewatering screw 20a. Water is present in the dewatering screw 20a to the level 51a. A conduit 56 in the dewatering screw 20a delivers wet, spent activated carbon to the bed 31. An appropriate bearing 56 is provided for the shaft 54 through a wall of the vessel 10. By maintaining water in the lower end 53 of the dewatering screw 20a, the amount of water entering into the vessel 10 is reduced and a positive pressure seal is provided against escaping gas from the vessel 10. Typically the pressure at the top of the vessel 10 is about 1 p.s.l.g. or less. A differential water level of about 25 inches will adequately seal the gases from the vessel 10.

We claim:

1. A method for regenerating spent activated carbon containing adsorbed volatile organic adsorbate comprising:
    establishing a confined downwardly moving bed of activated carbon; adding spent carbon to the top of said bed;
    introducing superheated steam into the bottom of said bed in contact with said carbon; recovering exit gas including predominantly superheated steam and volatilized adsorbate from the top of said bed; circulating a portion of said exit gas through a superheater and compressor to the bottom of said bed; withdrawing a portion of said exit gas through a cooler to condense steam and volatile adsorbate;
    continuously circulating superheated steam in a closed loop through said downwardly moving bed, said compressor and said superheater;
    recovering partially regenerated activated carbon containing residual volatile adsorbate from the bottom of said bed.

2. The method of claim 1 wherein said superheated steam is introduced at a pressure less than 20 psig and at a temperature above 300° F. into said confined downwardly moving bed.

3. A method for regenerating spent activated carbon containing adsorbed volatile organic adsorbate comprising:
    establishing a confined downwardly moving bed of activated carbon; adding spent activated carbon to the top of said bed;
    introducing superheated steam into the bottom of said bed in contact with said carbon; recovering exit gas including predominantly superheated steam and volatilized adsorbate from the top of said bed; continuously circulating a portion of said exit gas in a closed loop through a superheater and compressor to the bottom of said bed; cooling a portion of said exit gas to condense steam and volatile adsorbate;
    recovering heated, partially regenerated activated carbon containing residual volatile adsorbate from the bottom of said bed; confining said dry, heated, partially regenerated activated carbon in a closed chamber and withdrawing air and volatilized liquid adsorbate from said chamber as a gas stream and thereby establishing a sub-atmospheric pressure in said closed chamber; chilling said gas stream to condense volatilized adsorbate; and recovering cooled regenerated activated carbon from said chamber.

4. The method of claim 3 wherein 3 wherein said subatmospheric pressure is $10^{-2}$ torr or less.

5. Apparatus for regenerating spent activated carbon containing volatile organic adsorbate comprising:
    a steam treatment vessel having a top portion, an intermediate portion and a bottom portion; means for introducing spend activated carbon containing volatile organic adsorbate into said top portion to establish a downwardly moving bed through said intermediate portion and said bottom portion; means at said bottom portion for withdrawing heated, activated carbon containing less adsorbed volatile organic adsorbate than said spent activated carbon; means for introducing superheated steam into said bottom portion in contact with said carbon; means for withdrawing exit gas from said top portion containing predominantly superheated steam and volatized organic adsorbate; superheater means for superheating steam; compressor means for compressing steam; conduit means for delivering a portion of said exit gas from said means for withdrawing in a closed loop through said compressor means and said superheater means back to said bottom portion of said vessel.

6. The apparatus of claim 5 in which said superheated steam is at a pressure less than 20 psig and at a temperature above 300° F. at said bottom portion of said vessel.

7. Apparatus for regenerating spent activated carbon containing volatile organic adsorbate comprising:
    a steam treatment vessel having a top portion, an intermediate portion and a bottom portion; means for introducing spent activated carbon containing volatile organic adsorbate into said top portion to establish a downwardly moving bed through said intermediate portion and said bottom portion; means at said bottom portion for withdrawing heated activated carbon containing residual adsorbed volatile organic adsorbate; means for introducing predominantly superheated steam into said bottom portion in contact with said carbon; means for withdrawing exit gas from said top portion containing superheated steam and volatized organic adsorbate; superheater means for superheating steam; compressor means for compressing steam; conduit means for delivering a portion of said exit gas from said means for withdrawing in a closed loop through said compressor means and said superheater means back to said bottom portion of said vessel;
    chamber means for receiving partially regenerated, heated activated carbon containing residual adsorbed volatile organic adsorbate from said steam treatment vessel; vacuum pump means for withdrawing residual gases and volatilized adsorbate from said chamber to establish a subatmospheric pressure in said chamber; chiller means between said vacuum pump means and said chamber for condensing volatile organic adsorbate, and means for removing cooled regenerated activated carbon from said chamber.

8. The apparatus of claim 7 wherein said subatmospheric pressure is $10-2$ torr or less.

9. The apparatus of claim 7 in which said superheated steam is at a pressure less than 20 psig and at a temperature above 300° F. at said bottom portion of said vessel.

* * * * *